US010487596B2

(12) United States Patent
Behrens

(10) Patent No.: US 10,487,596 B2
(45) Date of Patent: Nov. 26, 2019

(54) COILED TUBING SWIVEL ASSEMBLY

(71) Applicant: Premier Coil Solutions, Inc., Waller, TX (US)

(72) Inventor: Randall Dean Behrens, Sealy, TX (US)

(73) Assignee: Premier Coil Solutions, Inc., Waller, TX (US)

( * ) Notice: Subject to any disclaimer, the term of this patent is extended or adjusted under 35 U.S.C. 154(b) by 729 days.

(21) Appl. No.: 14/669,754

(22) Filed: Mar. 26, 2015

(65) Prior Publication Data

US 2016/0281443 A1 Sep. 29, 2016

(51) Int. Cl.
*E21B 17/05* (2006.01)
*E21B 19/22* (2006.01)

(52) U.S. Cl.
CPC .............. *E21B 17/05* (2013.01); *E21B 19/22* (2013.01)

(58) Field of Classification Search
CPC ........... E21B 17/05; E21B 19/22; E21B 17/20
USPC ....... 166/77.2, 90.1, 365; 285/328, 333, 363
See application file for complete search history.

(56) References Cited

U.S. PATENT DOCUMENTS

| 4,199,131 | A | * | 4/1980 | Boski | ...................... E21B 29/04 251/291 |
| 4,519,238 | A | * | 5/1985 | Hailey | ................. G01M 3/2853 73/40.5 R |
| 6,595,555 | B2 | | 7/2003 | Ungchusri et al. | |
| 7,600,564 | B2 | * | 10/2009 | Shampine | ............... E21B 17/05 166/77.2 |
| 2003/0047944 | A1 | * | 3/2003 | Ungchusri | .......... F16L 27/0828 285/272 |
| 2005/0172472 | A1 | * | 8/2005 | Verger | .................. E21B 43/103 29/507 |
| 2006/0096751 | A1 | | 5/2006 | Brown et al. | |
| 2007/0051508 | A1 | * | 3/2007 | Pecorari | ............... E21B 43/126 166/68.5 |
| 2007/0151721 | A1 | | 7/2007 | Shampine et al. | |

FOREIGN PATENT DOCUMENTS

EP 1293716 A2 3/2003

OTHER PUBLICATIONS

European Search Report (EP 3073046), dated Aug. 3, 2016.

* cited by examiner

*Primary Examiner* — Robert E Fuller
*Assistant Examiner* — Lamia Quaim
(74) *Attorney, Agent, or Firm* — Lloyd L. Davis; Hunton Andrews Kurth LLP

(57) ABSTRACT

An oilfield assembly including a pump in fluid communication with a string of coiled tubing on a tubing reel through a coiled tubing swivel assembly, includes a fluid inlet segment coupled to a swivel body having a central axis, and a rotatable hollow shaft having a portion that extends axially within the swivel body, wherein the fluid inlet segment, swivel body and hollow rotatable shaft form a conduit for passage of a pumped substance to the tubing reel from the pump. The rotatable shaft includes a first end attachable to the tubing reel, and a distal second end, at least part of which is configured to engage a corresponding indentation in the body, thereby preventing direct contact between the distal end of the shaft and the pumped substance.

14 Claims, 3 Drawing Sheets

COILED TUBING SWIVEL ASSEMBLY

FIELD

Embodiments disclosed herein relate to coiled tubing units, and more particularly, high pressure swivel assemblies for delivering a pumped substance to the coiled tubing reel.

BACKGROUND AND SUMMARY

In coiled tubing operations, pressurized fluid is delivered from pumping equipment to the inside of the coiled tubing byway of a rotating swivel. Current swivels have several drawbacks. Today's rotating swivels use standard market hydraulic seals meant to contain axial pressure in a static condition. However, operational pressures are not typically static in nature and involve complex combinations of pressure variances, which degrade the service life of such hydraulic seals. Further, serviceability of current swivels, particularly replacing seals within the swivel, is inherently difficult and time consuming. Generally, the swivel must be completely removed from the tubing reel, repaired at a servicing facility, and reinstalled as a complete unit, which can take an entire coiled tubing unit out of service for a lengthy period of time. Finally, friction caused by fluid flow through current swivels erodes the interior of the swivel and deteriorates the high pressure seals in direct contact with fluids in the interior chamber of the swivel. Therefore, there is a need for an improved swivel assembly that addresses deficiencies of current swivels.

In one aspect, embodiments disclosed herein relate to an oilfield assembly comprising a pump in fluid communication with a string of coiled tubing on a tubing reel through a coiled tubing swivel assembly, the coiled tubing swivel assembly comprising a fluid inlet segment coupled to a swivel body having a central axis, and a rotatable hollow shaft having a portion that extends axially within the swivel body, wherein the fluid inlet segment, swivel body and rotatable hollow shaft form a conduit for passage of a pumped substance to the tubing reel from the pump, the rotatable shaft comprising a first end attachable to the tubing reel, and a distal second end, at least pan of which is configured to engage a corresponding indentation in the body.

In other aspects, embodiments disclosed herein relate to an oilfield assembly comprising a pump in fluid communication with a string of coiled tubing on a tubing reel through a coiled tubing swivel assembly, the coiled tubing swivel assembly comprising a fluid inlet segment coupled to a swivel body having a central axis, the swivel body comprising a removable end cap coupled to a swivel housing, a rotatable shaft insertable within the swivel housing, wherein the fluid inlet segment, swivel body and rotatable shaft form a conduit for passage of a pumped substance to the tubing reel from the pump, the rotatable shaft comprising a first end attachable to the tubing reel, and a second end configured to abut the end cap, wherein the rotatable shaft and the end cap comprise coaxial inner bores, and wherein a distance from the central axis to the end cap inner bore is equal to or less than a distance from the central axis to the shaft inner bore; and one or more rotary seals arranged circumferentially around an outer surface of the shaft and proximate to the distal second end of the shaft.

In yet other aspects, embodiments disclosed herein relate to a method using an oilfield assembly comprising a pump in fluid communication with a string of coiled tubing on a tubing reel through a coiled tubing swivel assembly, the coiled tubing swivel assembly comprising a fluid inlet segment coupled to a swivel body having a central axis, a rotatable hollow shaft having a portion that extends axially within the swivel body, wherein the fluid inlet segment, swivel body and rotatable hollow shaft form a conduit for passage of a pumped substance to the tubing reel from the pump, the rotatable shaft comprising a first end attachable to the tubing reel, and a distal second end, at least part of which is configured to engage a corresponding indentation in the body, thereby preventing direct contact between the distal second end of the shaft and the pumped substance, one or more rotary seals arranged circumferentially around an outer surface of the shaft and proximate to the distal second end of the shaft, one or more bearing assemblies disposed radially between the rotatable shaft and the swivel body; circumferentially arranged set screws configured to engage an innermost bearing assembly and a bearing retainer configured to engage an outermost bearing assembly. A method of disassembling the coiled tubing swivel assembly includes the steps of loosening the set screws from against the innermost bearing assembly, uncoupling the end cap from the swivel housing and removing the end cap; and inspecting or replacing the one or more rotary seals disposed at the second end of the shaft.

DETAILED DESCRIPTION

Figure 1:
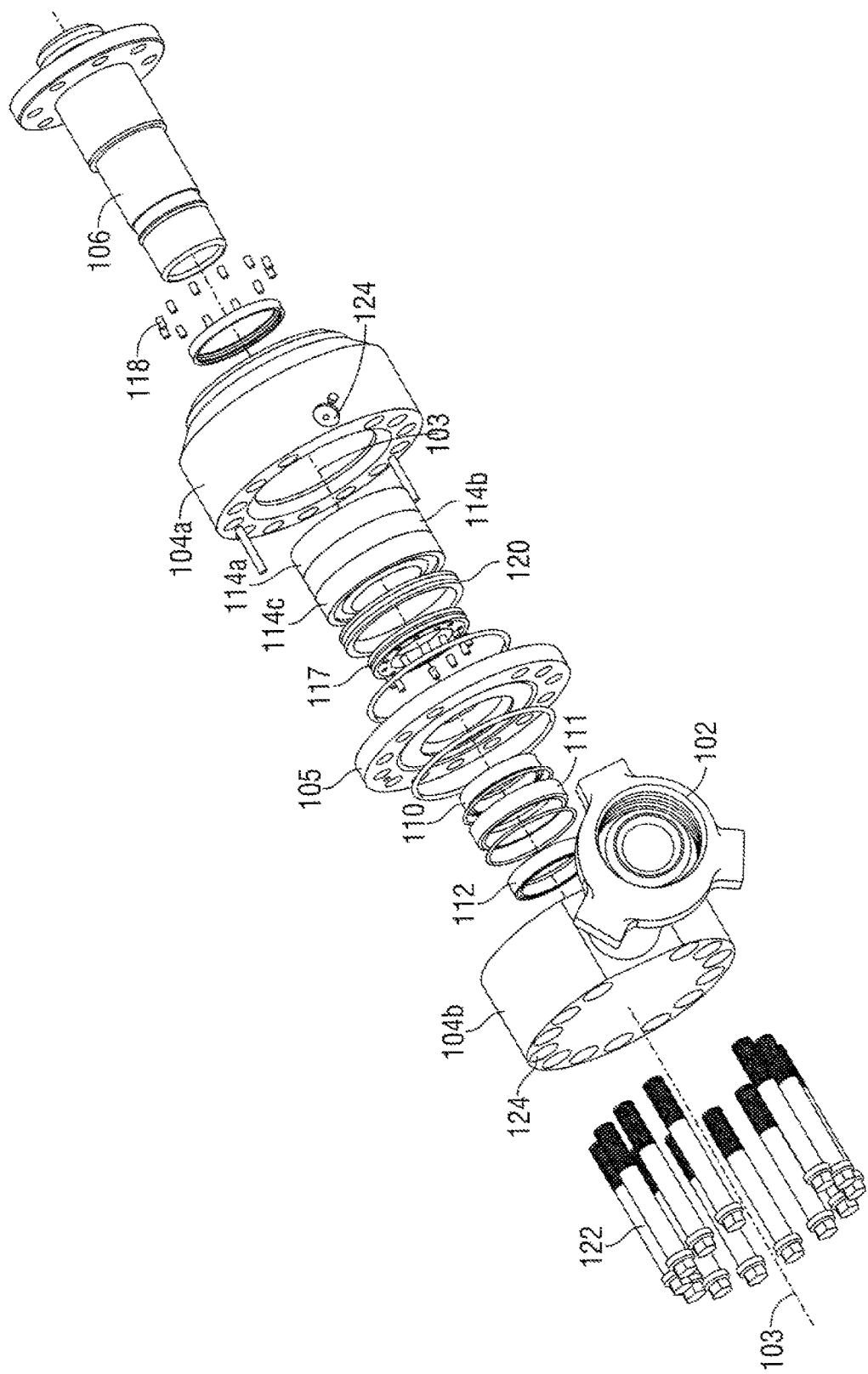
FIG. 1 illustrates an exploded view of one embodiment of a rotating swivel assembly.

An improved swivel assembly, used with a coiled tubing unit to allow for fluid flow under high pressure to the coiled tubing while continuously rotating, is disclosed. The coiled tubing unit may include a complete set of equipment necessary to perform standard continuous-length tubing operations in the field. For example, the coiled tubing unit may include a reel for storage and transport of coiled tubing, an injector head to provide surface drive force to run and retrieve coiled tubing, a control cabin from which an equipment operator may monitor and control the coiled tubing, and a power pack to generate hydraulic and pneumatic power required to operate the coiled tubing unit. The coiled tubing unit may further include other equipment for continuous-length or coiled tubing operations in the field. Moreover, in certain embodiments the coiled tubing unit may comprise onshore coiled tubing units such as truck mounted coiled tubing units or larger trailer mounted coiled tubing units. Still further, in other embodiments the coiled tubing unit may comprise offshore coiled tubing units such as those mounted on a lift boat, barge, offshore platform or any other offshore structure.

The swivel assembly includes a fluid inlet segment coupled to a swivel body having a central axis. High pressure fluid from the pump enters the swivel body through the fluid inlet segment. The fluid inlet segment may be a detachable standard connection. In certain embodiments, the swivel body includes a removable end cap coupled to a swivel housing. The swivel assembly further includes a rotatable shaft having a portion at least that extends axially within the swivel body. The shaft is hollow and has a central bore that extends therethrough. The shaft may be generally cylindrical or other shapes. A first end of the shaft is attachable to the tubing reel, and at least part of a second end of the shaft fits within a corresponding planar groove or indentation in the body. One or more rotary seals are arranged circumferentially around an outer surface of the shaft proximate to the second end of the shaft. The fluid inlet segment, swivel body and rotatable shaft form a conduit for passage of a pumped substance to the tubing reel from the pump.

The swivel assembly further includes one or more bearing assemblies disposed radially between the rotatable shaft and the swivel body. Any number of bearing assemblies adjacent one another may be used. The bearing assemblies may be configured for heavy duty service. Each bearing assembly includes a plurality of rolling elements radially disposed between (i) an outer race configured for a clearance fit with a radially adjacent inner surface of the swivel body and (ii) an inner race configured for a clearance fit with a radially adjacent outer surface of the shaft. The swivel assembly further includes circumferentially arranged set screws configured to engage an innermost bearing assembly (i.e., the bearing assembly closest to the first end of the shaft) and create an interference fit in an axial direction among the bearing assemblies against a bearing retainer disposed adjacent an outermost bearing assembly (i.e., the bearing assembly closest to the second end of the shaft) at an opposite end of the bearing assemblies.

The swivel assembly disclosed herein may have any bore size, e.g., 1 inch, 1.5 inch, 2 inch, 3 inch, or larger and may be rated at any working pressure (e.g., 10,000 psi, 15,000 psi, or greater). The swivel assembly may be configured for either onshore or offshore environments, and may further be configured or designed for fracturing fluids, drilling mud, and any other media types. The swivel assembly may be configured for standard or sour gas (H2S) service.

Figure 2:
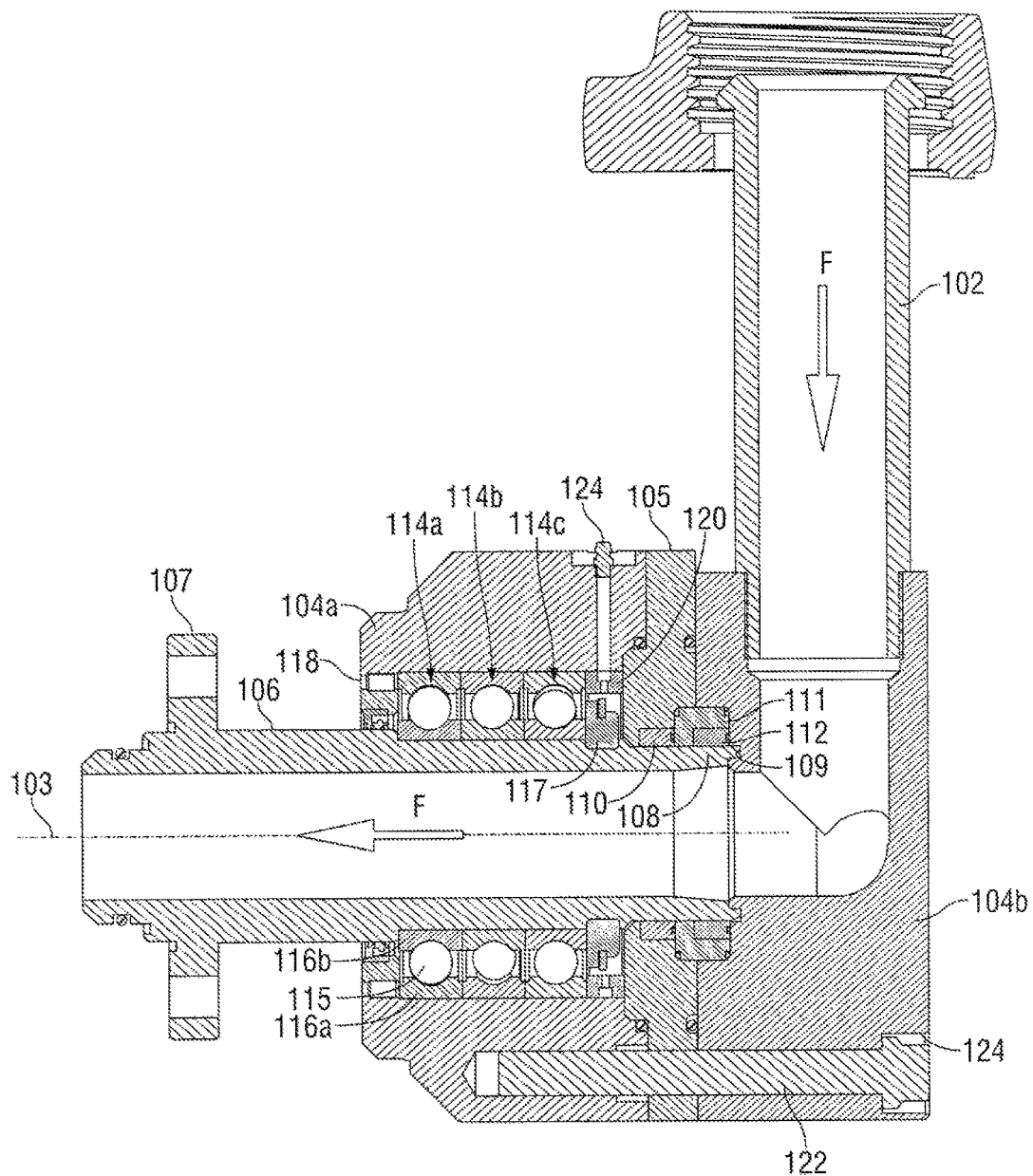
FIG. 2 illustrates a cross-section view of one embodiment of a rotating swivel assembly.
Figure 3:
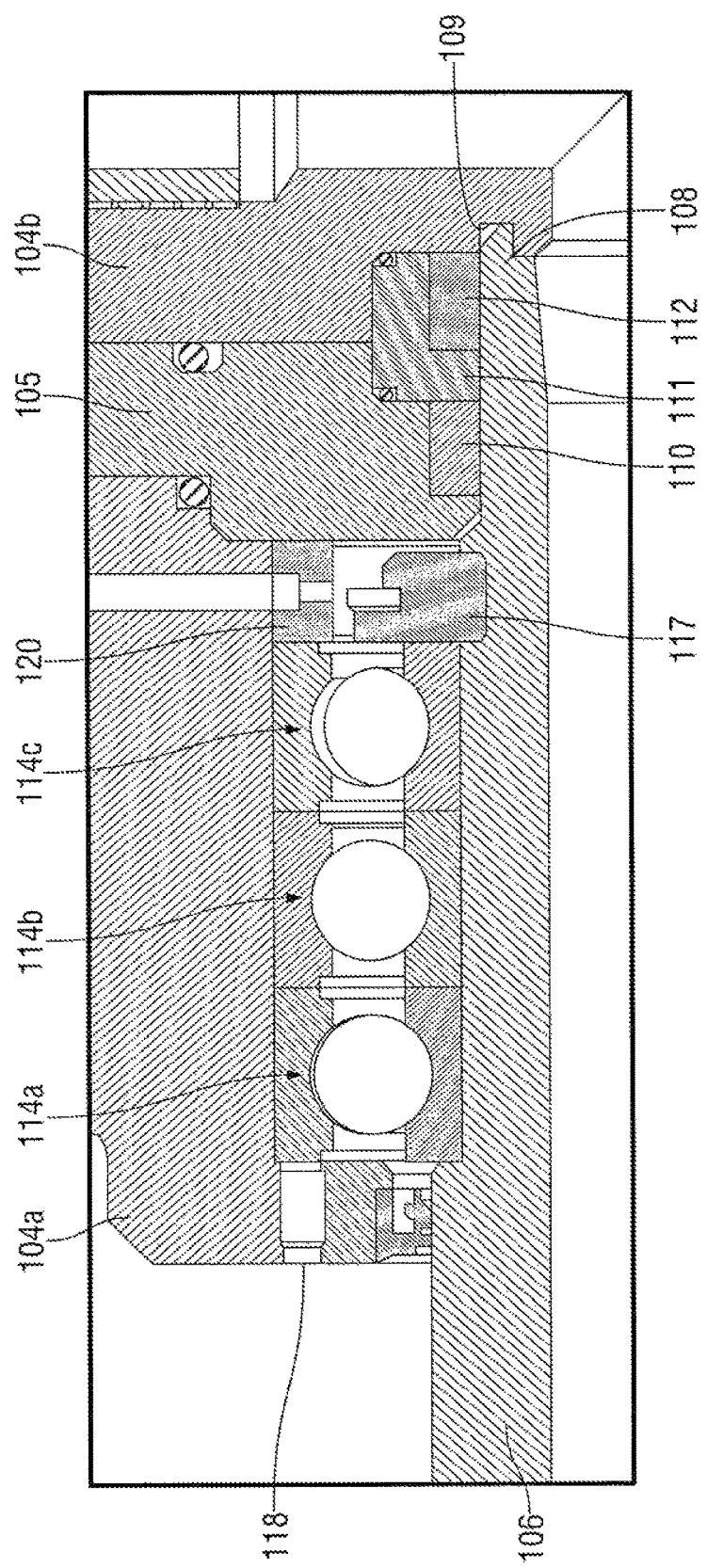
FIG. 3 illustrates an enlarged cross-section view from FIG. 2.

FIG. 1 illustrates an exploded view of an embodiment of the swivel assembly 100 disclosed herein. FIGS. 2 and 3 illustrate cross-section views of the assembled swivel disclosed herein. The swivel assembly 100 includes an end cap 104b coupled to a housing 104a, e.g., by one or more bolts 122 fastened in corresponding bolt holes 124. The central axis 103 extends through the housing 104a. A fluid inlet segment 102 is coupled to the end cap 104b. A seal retainer flange 105 may be axially disposed between the end cap 104b and housing 104a. The seal retainer flange 105 is configured to secure one or more high pressure seals, as explained in greater detail below.

A rotating or rotatable shaft 106, or at least a portion of the shaft, extends coaxially along central axis 103 within the swivel housing 104a. The shaft 106 has a central bore therethrough that extends coaxially with the central axis 103. The end cap 104b has a first portion of an inner bore that is coaxially aligned with the central axis 103 and central bore of the shaft 106. The end cap 104b has a second portion of the inner bore that is arranged at about a 90 degree angle relative to the central axis 103, although other angles are possible. The second portion of the inner bore is coaxially aligned with the fluid inlet segment 102. As illustrated, the fluid inlet segment 102, end cap 104b, and the rotatable shaft 106 form a conduit for passage of a pumped substance to the tubing reel from the pump (illustrated by arrows F in FIG. 2). A first end 107 of the shaft is attachable to the tubing reel (not shown).

As illustrated, a second end 108 of the shaft 106 fits within a corresponding groove 109 in a planar surface of the end cap body 104b, which is perpendicular to the central axis 103 of the housing 104a. The second end 108 of the shaft 106, or a portion of the distal end of shaft 106, is configured to engage a corresponding groove 109 or indentation in the end cap 104b. That is, the second end 108 fits within and rotates within the corresponding groove 109 or indentation. As such, the distal end of the second end 108 of shaft 106 is prevented from coming into direct immediate contact with fluid flowing through the swivel assembly. In certain embodiments, the groove or indentation is formed in a generally planar surface of end cap 104b perpendicular to the central axis 103 of the swivel housing 104a. In some instances, the second end 108 of shaft 106 and corresponding groove may be characterized as a type of tongue and groove fit. The distal end of second end 108 may have a constant thickness in certain embodiments, and a varied thickness in other embodiments (e.g., tapered).

In certain aspects, a distance from the central axis 103 to an inner surface of the first portion of the inner bore within the end cap 104b is equal to or less than a distance from the central axis 103 to an inner surface of the central bore of the shaft 106.

One or more rotary seals 110, 112 may be arranged circumferentially around an outer surface of the shaft 106 proximate to the second end 108 of the shaft. The rotary seals may be made of any sealing material capable of withstanding high pressure and high temperature, and have any cross section shape or configuration. The rotary seals 110, 112 may be secured fully or partially within the seal retainer flange 105 axially disposed between the end cap 104b and housing 104a. The rotary seals are configured to seal against a fluctuating inconstant fluid pressure present in the interior chamber of the swivel housing 104a and/or end cap 104b during operation. That is, seals used in the swivel are configured to rotate while sealing against varying high pressure applications, as opposed to hydraulic seals meant to contain axial pressure to a static condition. The rotary seals may be configured to withstand fluctuating pressures of up to 15,000 psi, or greater.

The swivel assembly 100 further includes one or more bearing assemblies 114a, 114b, 114c disposed radially between the rotatable shaft 106 and the swivel housing 104a. Each bearing assembly includes a plurality of rolling elements 115 radially disposed between (i) an outer race 116a configured for a clearance fit with an inner surface of the swivel housing 104a and (ii) an inner race 116b configured for a clearance fit with an outer surface of the shaft 106. The swivel assembly 100 further includes a bearing retainer 117 disposed axially at one end of the bearing assemblies (i.e. abutting outermost bearing retainer 114c), and circumferentially arranged set screws 118 disposed axially at the opposite end of the bearing assemblies, the set screws 118 configured to engage the innermost bearing assembly 114a and create an interference fit in an axial direction among the bearing assemblies against the bearing retainer 117. A low pressure seal 120 may be disposed adjacent the outermost bearing assembly 114c. A grease fitting 124 in the housing 104b may be configured to provide lubrication to the bearing assemblies.

Assembling the swivel assembly may generally involve the following steps: Bearing assemblies 114a, 114b, 114c are installed in swivel housing 104a. Outer races 116a of the bearing assemblies are configured for a clearance fit with an inner surface of the swivel housing 104a. Shaft 106 is then inserted within swivel housing 104a. Inner races 116b of the bearing assemblies are configured for a clearance fit with an outer surface of the swivel housing 104b. Bearing retainer 117 is installed adjacent to the outermost bearing assembly 114c and secured in place, e.g., using set screws, snap rings or other devices. Set screws 118 are threaded into corresponding holes in the swivel housing 104a against a side of the innermost bearing assembly 114a opposite from the bearing retainer 117, until set screw threads grab, but the set screws are not tightened fully. A low pressure seal 120 may also be installed into the swivel housing 104a proximate to the bearing retainer 117. The seal retainer flange 105 is coupled to the swivel housing 104a. A first high pressure seal 110 is installed in a corresponding seal groove in the seal retainer flange 105. A second high pressure seal 112 may be installed in a seal insert 111, and the assembled seal insert 111 and second high pressure seal 112 may be installed, fully or partially, adjacent the first high pressure seal 110 in the seal retainer flange 105. Swivel end cap 104b is then coupled to the swivel housing 104a by a plurality of bolts 122 installed in corresponding holes 124 extending through the swivel housing 104a, flange 105, and end cap 104b. Threads of the bolts 122 may be coated with an anti-loosening compound, e.g., Loctite. The set screws 118 are then fully tightened as appropriate to engage the adjacent bearing assembly 114a. Fully tightening the set screws 118 creates an interference fit among the bearing assemblies 114a, 114b, 114c in an axial direction against the bearing retainer 117. Outer races 116a and inner races 116b remain in clearance fit with respective radially adjacent surfaces. Additional seals, gaskets and other components may be installed at various stages of assembly, but are not mentioned in the foregoing assembly steps. Disassembling the swivel assembly completely may generally involve performing the foregoing steps in reverse order.

In certain instances, the swivel assembly 100 may be partially disassembled to inspect or replace the high pressure rotary seals 110 and 112. The set screws 118, which are tightened against the innermost bearing assembly 114a to create an interference fit among all bearing assemblies 114a, 114b, 114c in an axial direction against the bearing retainer 117, are loosened. Individual components of the swivel assembly 100 may then be removed; the bolts 122 may be loosened and removed from bolt holes 124 to remove the end cap 104b and, if desired, the seal retainer flange 105. Removal of the end cap 104b provides access to the high pressure rotary seals 110 and 112, which can be inspected or replaced as needed. After one or more of the high pressure seals 110 and 112 are inspected or replaced, the seal retainer flange 105, if it was removed, may be reinstalled against the swivel housing 104a, followed by the end cap 104b. Bolts 124 may be reinserted within bolt holes 122 (perhaps with a new coating of anti-loosening compound) and tightened appropriately.

Advantageously, embodiments of the swivel assembly disclosed herein provide improved serviceability and service life over swivels currently available. The fluid flow path through the swivel body, particularly the second end of the shaft fitted within a corresponding indentation in the swivel body, minimizes wear and deterioration of the rotary seals and interior chamber that is typically caused by high pressure fluid flow with abrasive material. That is, seal design and swivel construction provide for much greater service life. Further, the swivel construction allows greater access to maintenance components without removing the entire swivel from the reel. Fewer items are removed (e.g., in some instances only the end cap) in order to gain access to the seals. This reduces maintenance time and possibility of incorrect reassembly.

Reference throughout this specification to "one embodiment" or "an embodiment" or "certain embodiments" means that a particular feature, structure or characteristic described in connection with the embodiment is included in at least one embodiment of the present disclosure. Therefore, appearances of the phrases "in one embodiment" or "in an embodiment" or "in certain embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Therefore, the term comprising, when used in the claims, should not be interpreted as being limitative to the means or elements or steps listed thereafter. Any one of the terms including or which includes or that includes as used herein is also an open term that also means including at least the elements/features that follow the term, but not excluding others. Accordingly, including is synonymous with and means comprising.

It should be understood that the term "coupled," when used in the claims, should not be interpreted as being limitative to direct connections only. "Coupled" may mean that two or more elements are either in direct physical, or that two or more elements are not in direct contact with each other but yet still cooperate or interact with each other.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. An oilfield assembly comprising a pump in fluid communication with a string of coiled tubing on a tubing reel through a coiled tubing swivel assembly, the coiled tubing swivel assembly comprising:
   a swivel housing having a central axis;
   an end cap coupled to one end of the swivel housing; and
   a rotatable hollow shaft comprising a first end attachable to the tubing reel, a portion that extends axially within the swivel housing between the first end and a second end,
   wherein the second end engages a groove in the end cap such that an inner diameter portion of the second end is protected from direct contact with the pumped substance as the pumped substance flows in a direction from the pump through the end cap, swivel housing, and rotatable hollow shaft to the tubing reel.

2. The swivel assembly of claim 1, further comprising one or more rotary seals arranged circumferentially around an outer surface of the shaft and proximate to the distal second end of the shaft wherein the rotary seals are configured to rotate with the shaft.

3. The swivel assembly of claim 1, further comprising one or more bearing assemblies disposed radially between the rotatable shaft and the swivel body, each bearing assembly comprising:
   a plurality of rolling elements radially disposed between (i) an outer race configured for a clearance fit with an inner surface of the swivel body and (ii) an inner race configured for a clearance fit with an outer surface of the shaft.

4. The swivel assembly of claim 3, further comprising circumferentially arranged set screws configured to engage an axially innermost bearing assembly and a bearing retainer configured to engage an axially outermost bearing assembly, whereby tightening the plurality of set screws is configured to create an interference fit in an axial direction among the bearing assemblies.

5. The swivel assembly of claim 1, further comprising a seal retainer flange disposed axially between the end cap and swivel housing.

6. The swivel assembly of claim 5, further comprising a plurality of bolts configured to engage corresponding bolt holes extending axially through each of the end cap, seal retainer flange, and swivel housing.

7. The swivel assembly of claim 1, further comprising a low pressure sealing element disposed within the swivel body.

8. An oilfield assembly comprising a pump in fluid communication with a string of coiled tubing on a tubing reel through a coiled tubing swivel assembly, the coiled tubing swivel assembly comprising:
- a fluid inlet segment coupled to a swivel body having a central axis, the swivel body comprising a removable end cap coupled to a swivel housing having a central axis; and
- a rotatable shaft insertable within the swivel housing, wherein the fluid inlet segment, swivel body and rotatable shaft form a conduit for passage of a pumped substance to the tubing reel from the pump;
- the rotatable shaft comprising a first end attachable to the tubing reel, and a second end configured to engage a corresponding groove in a planar surface of the end cap perpendicular to the central axis of the swivel housing,
- wherein the second end engages the groove in the end cap such that an inner diameter portion of the second end is protected from direct contact with the pumped substance as the pumped substance flows in a direction from the pump through the end cap, swivel housing, and rotatable hollow shaft to the tubing reel.

9. The swivel assembly of claim 8, further comprising one or more rotary seals arranged circumferentially around an outer surface of the shaft and proximate to the distal second end of the shaft.

10. The swivel assembly of claim 8, further comprising one or more bearing assemblies disposed radially between the rotatable shaft and the swivel body, each bearing assembly comprising:
- a plurality of rolling elements radially disposed between (i) an outer race configured for a clearance fit with an inner diameter of the swivel body and (ii) an inner race configured for a clearance fit with an outer diameter of the shaft.

11. The swivel assembly of claim 10, further comprising circumferentially arranged set screws configured to engage an axially innermost bearing assembly and create an interference fit in an axial direction among the bearing assemblies.

12. The swivel assembly of claim 8, further comprising a seal retainer flange disposed axially between the end cap and swivel housing.

13. The swivel assembly of claim 12, further comprising a plurality of bolts configured to engage corresponding bolt holes extending axially through each of the end cap, seal retainer flange, and swivel housing.

14. The swivel assembly of claim 8, further comprising a low pressure sealing element disposed within the swivel body.

* * * * *